Figure 1:
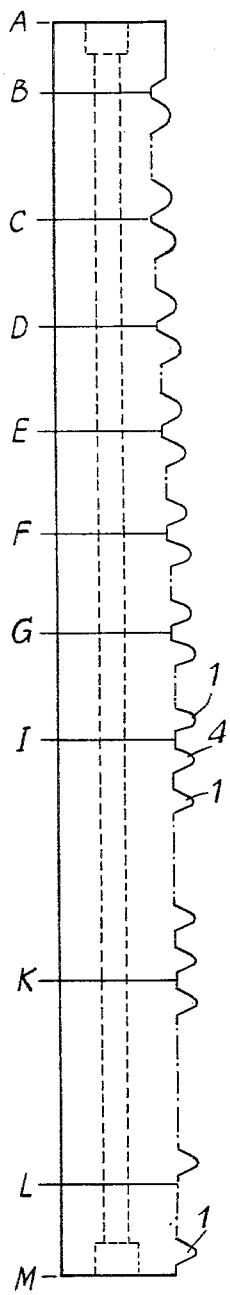

Feb. 16, 1965  R. C. CLERK  3,169,419
FORMATION OF GEAR TEETH ON BARS OR BLANKS
Filed July 12, 1962

INVENTOR
ROBERT C. CLERK
BY *Imrie and Smiley*
ATTORNEYS

United States Patent Office 3,169,419
Patented Feb. 16, 1965

3,169,419
FORMATION OF GEAR TEETH ON
BARS OR BLANKS
Robert Cecil Clerk, 97 High St., Maidenhead, England
Filed July 12, 1962, Ser. No. 209,436
5 Claims. (Cl. 80—20)

This invention concerns improvements relating to the formation of gear teeth on bars or blanks.

It is well known to form involute splines on a bar or shaft by rolling between forming racks mounted on slides traversing contra-directionally. Unfortunately the established ways of obtaining initial indexing indentations on the bar such as by tapering the racks or by cutting or grinding a tapering flat over parallel forming racks, do not provide the pitch precision necessary to mated running involute gears, nor do they allow much diametrical tolerance on the basic bar or blank as the initial pitch indexing tends to be inversely proportional to overall diameter of the bar or blank.

One purpose of the present invention is to provide a form of rack which will index the initial indentations on the basic bar or blank with a geometric precision dependent only on the manufacturing accuracy of the forming racks, and furthermore do this in spite of any reasonable production tolerance variation of the bar or blank diameter, so that after indexing round one revolution of the bar or blank, the pitch index is neither short nor over but is precisely aligned for a next series of deeper penetrations.

To this end the invention provides a rack for forming gear teeth on bars or blanks including at least one set of forming teeth in which the set of teeth for making initial contact with a bar or blank are substantially identical and have their tips radiused to within machining capabilities about their pitch centers, their pitch being determined in relation to the desired penetration of the set of teeth and a measure of the thickness of the bar or blank. The number of forming teeth may be sufficient to index a complete circumference of a bar or blank.

From another point of view the invention provides a rack for forming, with a similarly constructed rack moving in the opposing direction, gear teeth on bars or blanks, having at least one set of forming teeth in which the set of teeth for making initial substantially equal penetrations in a bar or balnk are radiused to within manufacturing capabilities about their pitch centers, their pitch being determined in relation to the minimum separation of the tips of the teeth of the two racks.

The tip radius may be the largest which will fit at approximately the pitch circle between the full teeth that it is desired to form on the bar or blank.

The face and flank angles of the forming teeth may be arranged to remain substantially clear of the work in formation.

The faces and flanks of the forming teeth may be concave to maintain the face and flank angles clear of the work and yet leave the base of each tooth as wide as possible.

The number of teeth in the initial set may be half the number required for initial indexing (plus and minus one half tooth to each rack for forming odd numbers of teeth on a work bar or blank) or a number of non-working teeth may be included or non-working pitches may be included before any further working set or cascade.

The tolerance of the system to variations in work bar or blank diameter and to manufacturing variations in the value of the radius of the tips of the teeth is largely determined by the depth of indentation, or more specifically by the angle of departure beyond center of each completed indentation before the following form rack tooth makes contact with the work bar or blank periphery. When this angle of departure is zero the tolerance to manufacturing variation is very high, and the tolerance remains acceptable over a fairly large angle of departure, being to some extent dependent on the strain deflection of the machine in the direction of the above-mentioned intercept.

It will be appreciated that it is possible to calculate the optimum center and radius of a forming circle (i.e. the form of the tip of each tooth of a given cascade) from a knowledge of the blank radius, the depths of the successive penetrations and the final formed tooth configuration. In other words, the configuration of a particular forming tooth follows from the result it is to provide. In essence the radius and distance of the center of the radiused tip of a forming tooth from the effective center of rotation of the gear blank will be equal respectively to the radius of a measuring roller which will fit the space between successive teeth of a typical fully formed gear wheel at a position such that the shortest distance between its circumference and the center of the gear wheel is the same as the mean radius of the unformed blank less the penetration of that particular set of forming teeth.

Each cascade will have a pitch between teeth determined by the distance of the tip centers of the opposed or cooperating cascade, having reference to the number of teeth formed on the work blank. The pitch of adjacent teeth of successive cascades requires careful calculation but in practice corresponds approximately to the mean of the pitches of the immediately preceding and following cascades.

Instead of successive parallel cascades of penetrant teeth following the indexing cascade, it is possible to have a rising or tapered cascade but this suffers from the manufacturing difficulty that every tooth requires to be of different shape from its fellows and each successive pitch requires to be finitely shorter to compensate for the rise of the centers of successive radiused tooth tips.

As the flanks of the form teeth following through into the work blank from the radiused tips are designed to clear the work in progress as earlier described, the successively deeper radial penetrations of differently radiused tips into the work blank will leave the sides of the formed notches and spoil crests slightly discontinuous or scalloped, needing to be subsequently smoothed into continuous involute faces by later cascades of more conventional forming teeth.

Figure 2:
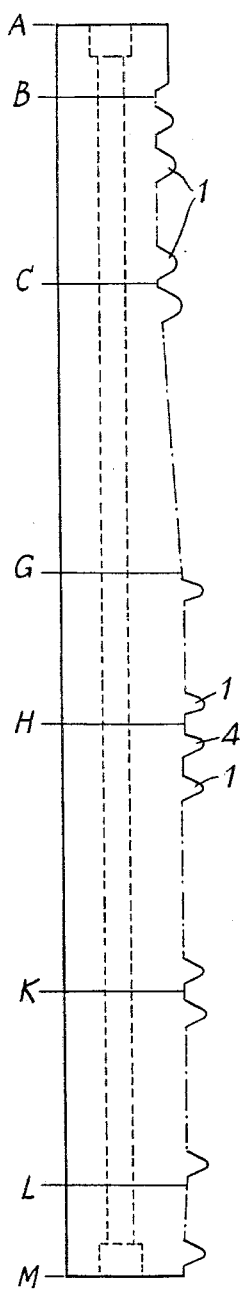
Figure 3:
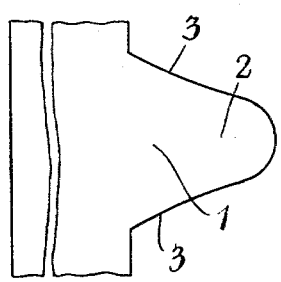

These and other features of the invention are embodied in two preferred varieties of tooth forming rack which will now be described by way of example with reference to the accompanying drawings in which:

FIG. 1 is an elevation of one form of rack,
FIG. 2 is a similar view of another form of rack,
FIG. 3 is an elevation of a specimen tooth.

Gear teeth are formed on a bar or blank by a pair of substantially similar racks arranged for parallel powered movement in opposing directions, rolling the bar or blank between them. The racks are mounted in any suitable rolling machine, though a machine having a pair of high speed piston operated slides is to be preferred.

If an even number of teeth were to be produced on the blank, then the forming racks would be identical, but with an odd number of teeth to be formed (the rack of FIG. 1 is designed to form 19) the number of teeth of each rack differs by one over a length of rack corresponding to a rotation of the blank through 180 degrees.

The rack may be formed in one length, but it is preferred to build it from sections held together by a long bolt as indicated in both figures, the bolt in each figure being shown in dotted lines.

Basically each rack comprises a number of sections, AB, BC, CD, . . . LM, the section AB having no teeth and being used as a gauging section, while the remaining sections have numbers of identical teeth 1.

The section BC has 10 indexing teeth (the other rack of the pair having 9 teeth). Each tooth (see FIG. 3) has its tip radiused about its pitch center 2 and has concave sides 3. The term pitch center is defined as the point falling on the radial pitch and center line of a tooth which is also the center of the curved tooth tip.

The pitch of these teeth is determined by the separation of the racks and the required penetration of the teeth on initial indexing.

The next section CD has 9 teeth (the other rack of the pair having 10 teeth), of greater penetration than the teeth of section BC and of a pitch and shape to exert a punching effect into the indexing indentations caused by the teeth of the section BC.

Sections DE, EF, FG, GI having 10, 9, 10 and 9 teeth respectively, of differing pitches and dimensions but substantially the same configuration, continue the formation of the teeth by stages.

Sections HK, KL of 19 teeth each are used to improve the finish of the teeth, since a scalloped finish is imparted by the previous sections.

Section LM of 10 teeth does not work on the blank and allows withdrawal of the forming teeth without loss of control.

In FIG. 1 tooth 4 is a transfer tooth to effect a smooth conversion from the last forming section GI and the first finishing section IK. This tooth does no work.

In FIG. 2 the sections from C to G are replaced by an ascending series of 39 teeth each tooth being of a different size and each pitch being distinct to accomplish the formation of the teeth on the blank by methods approximating to those in standard use. This rise is consolidated by a section GH having 9 teeth and the teeth are finished and withdrawn by the sections from H to M.

In effect this rack is a combination of the rack of FIG. 1 with the standard tapered rack.

A suitable coordinating control for two such racks is found to be a loosely fitting idler roller or cog meshed with a pair of parallel dummy racks. The slackness of fit is such that as the bar or blank nears completion, it assumes control of synchronized movement of the racks from the idler roller or cog.

It is to be understood that the invention is not restricted to the exact details shown and described but embraces such modifications as come within the ambit of the accompanying claims.

I claim:

1. A rack for forming gear teeth upon a blank, comprising a longitudinally movable bar having a first forming section followed by at least one additional forming section, said first forming section being sufficient in length to index the blank through half a revolution, a series of identical first forming teeth in said first section for making initial small penetrations of selected equal depth in the blank, said first forming teeth having equal pitch spacing longitudinally of the bar, the tips of said first forming teeth being rediused about their pitch centers, each of said additional forming sections including a plurality of forming teeth, the pitch and the tip radii of the teeth of each additional section being respectively different from those of said first forming teeth, and said forming teeth of said additional sections being arranged for penetration to progressively greater depths in the blank.

2. A rack according to claim 1 in which the faces and flanks of the said first forming teeth are concave.

3. A rack for forming gear teeth upon a blank according to claim 1 in combination with a second and substantially identical but reversed rack for moving in the opposite direction.

4. A rack according to claim 1 in which the number of teeth in said series of first forming teeth is sufficient to index the blank through a complete revolution.

5. A rack for forming gear teeth upon a blank, comprising a longitudinally movable bar having a first forming section followed by at least one additional forming section, said first forming section being sufficient in length to index the blank through half a revolution, a series of identical first forming teeth in said first section for making initial small penetrations of selected equal depth in the blank, said first forming teeth having equal pitch spacing longitudinally of the bar, the tips of said first forming teeth being radiused about their pitch centers, each of said additional forming sections including a plurality of substantially identical forming teeth having equal pitch and equal tip radii, the pitch and the tip radii of the teeth of each additional section being respectively different from those of said first forming teeth, and said forming teeth of said additional sections being arranged for penetration to progressively greater depths in the blank.

References Cited by the Examiner

UNITED STATES PATENTS

| 440,763 | 11/90 | Simonds | 80—20 |
| 2,930,877 | 3/60 | Pelphrey | 80—20 |

FOREIGN PATENTS

| 258,062 | 5/49 | Switzerland. |

CHARLES W. LANHAM, *Primary Examiner.*